(12) United States Patent
Merkle

(10) Patent No.: US 9,652,703 B1
(45) Date of Patent: May 16, 2017

(54) TAG AND SEAL EMPLOYING A MICROMACHINE ARTIFACT

(75) Inventor: Peter B. Merkle, St. Augustine, FL (US)

(73) Assignee: Sandia Corporation, Albuquerque, NM (US)

( * ) Notice: Subject to any disclaimer, the term of this patent is extended or adjusted under 35 U.S.C. 154(b) by 1071 days.

(21) Appl. No.: 13/114,542

(22) Filed: May 24, 2011

(51) Int. Cl.
*B32B 7/12* (2006.01)
*G06K 19/06* (2006.01)

(52) U.S. Cl.
CPC .............................. *G06K 19/06009* (2013.01)

(58) Field of Classification Search
CPC .......... B41J 3/445; G06F 21/86; B82Y 30/00
USPC .............. 428/936, 915, 916, 45, 192, 195.1; 438/118; 361/672, 654; 340/539.31; 713/194; 283/74
See application file for complete search history.

(56) References Cited

U.S. PATENT DOCUMENTS

| | | | | |
|---|---|---|---|---|
| 3,660,154 | A * | 5/1972 | Scott-Monck et al. | 438/571 |
| 5,770,283 | A * | 6/1998 | Gosselin et al. | 428/35.7 |
| 6,696,126 | B1 * | 2/2004 | Fischer et al. | 428/40.2 |
| 6,708,618 | B1 * | 3/2004 | Tsai | G06K 19/086 101/31.1 |
| 6,902,807 | B1 * | 6/2005 | Argoitia et al. | 428/403 |
| 2002/0084329 | A1 * | 7/2002 | Kaye | G06K 19/06009 235/462.01 |
| 2003/0098357 | A1 * | 5/2003 | Cummings et al. | 235/494 |
| 2004/0067360 | A1 * | 4/2004 | Steenblik et al. | 428/402 |
| 2004/0082098 | A1 * | 4/2004 | Schmid | 438/99 |
| 2004/0112962 | A1 * | 6/2004 | Farrall et al. | 235/462.01 |
| 2004/0262400 | A1 * | 12/2004 | Chang et al. | 235/468 |
| 2006/0261915 | A1 * | 11/2006 | Lutz et al. | 333/186 |
| 2007/0297037 | A1 * | 12/2007 | Khonsari et al. | 359/290 |
| 2008/0213904 | A1 * | 9/2008 | Sliwa | A61B 5/0059 436/56 |
| 2010/0068523 | A1 * | 3/2010 | Williams et al. | 428/403 |
| 2012/0104660 | A1 * | 5/2012 | Disawal | A61J 1/00 264/494 |
| 2013/0292879 | A1 * | 11/2013 | Disawal | B29C 45/372 264/328.2 |
| 2014/0028011 | A1 * | 1/2014 | Yamauchi | B41M 3/14 283/74 |

OTHER PUBLICATIONS

"Micromachine Artifact Tag and Seal" by Sandia National Laboratories, date retrived on Nov. 9, 2014.*
"Automated Reflective Particle Tag System for Physical Authentication," International Safeguards/Nuclear Monitoring Science and Technology, Organization 6723, Published Jul. 14, 2010 by Peter B. Merkle et al., 9 pages.
"Automated Reflective Particle Tag System for Physical Authentication," Containment Surveillance Workshop, Jun. 8. 2010 by Peter B. Merkle et al., 24 pages.

* cited by examiner

Primary Examiner — Anish Desai
(74) Attorney, Agent, or Firm — Daniel J. Jenkins

(57) ABSTRACT

A tamper resistant seal including a population of particles embedded in an adhesive, the population including at least one micromachine artifact of a predetermined physical shape.

10 Claims, 10 Drawing Sheets

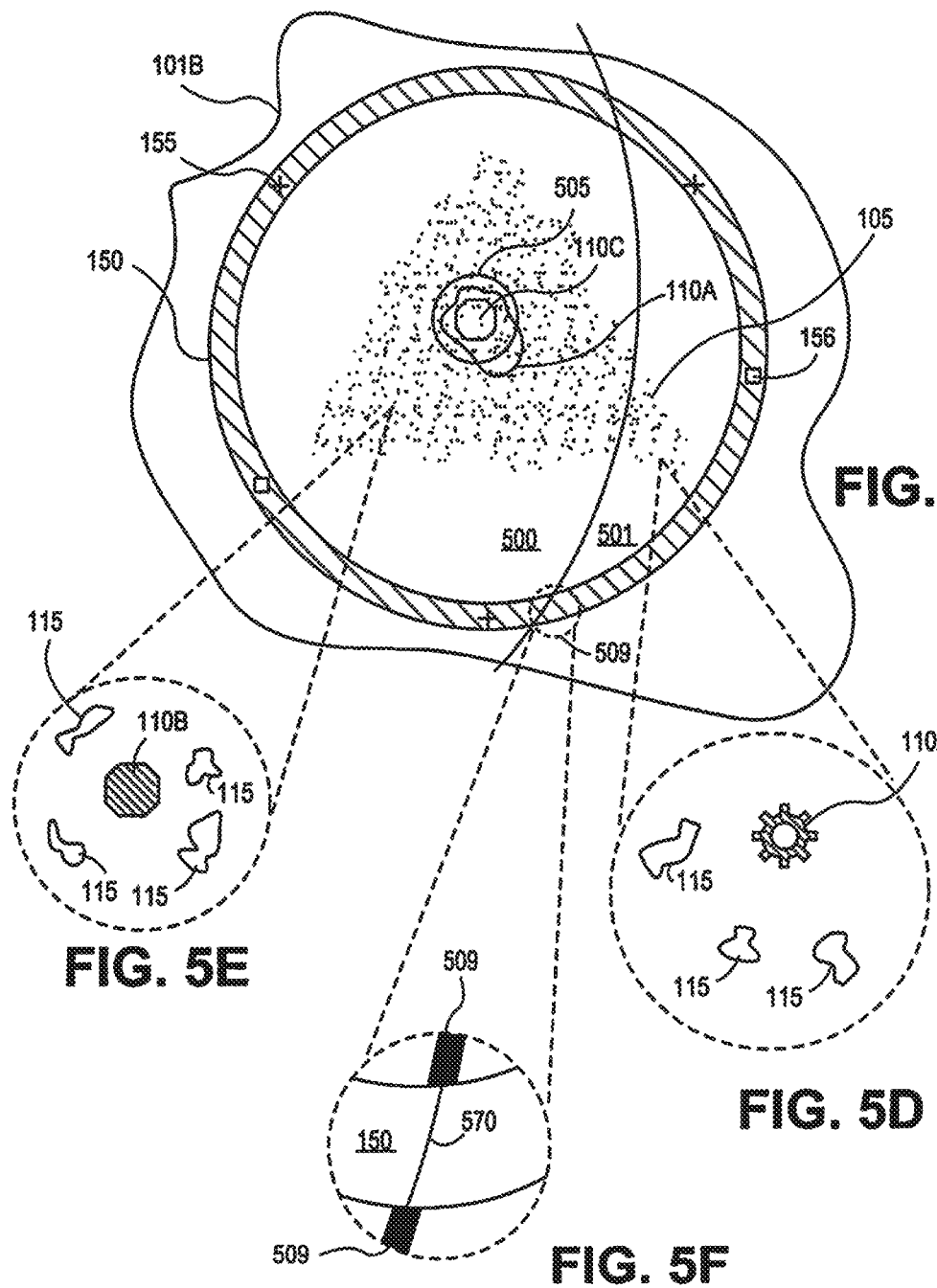

TAG AND SEAL EMPLOYING A MICROMACHINE ARTIFACT

GOVERNMENT INTERESTS

Embodiments of the invention were developed under Contract No. DE-AC04-94AL85000 between Sandia Corporation and the U.S. Department of Energy. The United States Government has certain rights in this invention.

TECHNICAL FIELD

Embodiments of the invention are in the field of physical object tags and tamper indicators and more particularly relate to tags and seals employing a micromachine artifact for tamper resistant identification of objects.

BACKGROUND

Reflective Particle Tag (RPT) technology is in use for physical authentication of a tagged item. Generally, conventional RPT technology entails a field-applied tag, such as a bar code, and a seal composed of a random distribution of specular mineral particles, such as hematite, embedded in an adhesive. When illuminated from different angles, a RPT presents complex patterns of millimeter-scale light reflections unique to the tag. Generally, an RPT procedure entails measuring reference reflected light patterns upon field application of the seal which are recorded in association with the tag (e.g., bar code) to a reference database. Subsequent authentication then entails remeasuring the light reflecting patterns of the seal and comparing the patterns to those recorded for the tag in the reference database. A mismatch is indicative of seal tampering, for example where a seal is broken to access an item's contents or to relocate the tag to another item.

Advances in imaging and computing technology have permitted automation of the RPT procedure, enable greater inspection efficiency and wider adoption by various regulatory authorities. Techniques to increase the uniqueness of an RPT, for identifying the source of a RPT for example, and/or to provide additional protection against sophisticated methods of tampering, such as bisection and delamination, are therefore advantageous.

SUMMARY OF THE DESCRIPTION

The tag technology described herein imparts a predetermined physical uniqueness to at least a subset of particles embedded in an adhesive. In the exemplary embodiment, at least one, and advantageously more than one, micromachine artifact is included in the population of particles which are embedded in the adhesive. As such, one or more of a physical structure, a count, or a relative location, of the one or more micromachine artifacts may be associated with a particular seal to provide a basis for identifying the seal itself (e.g., the seal is cataloged based on a key derived from the physical shape(s) of the micromachine artifacts), identifying a source/origin of a seal, or identifying an attempt at tampering with seal.

In an embodiment, a RPT includes a population of particles, a first subset of which are specularly reflective, and a second subset of which are micromachine artifacts having a predetermined physical shape. The first and second subsets of the particle population may be randomly distributed in an adhesive matrix. Depending on the embodiment, the micromachine artifacts may contribute to a reflective signature of the tag. In embodiments, the micromachine artifacts have a critical dimension no great than 500 microns.

In an embodiment, a frame is embedded in the adhesive matrix. The frame may be of a contiguous material which forms a perimeter surrounding the population of particles. For example, the frame may be monocrystalline and include alignment marks integrally formed into the frame material.

Embodiments include application and measurement of a tag including a micromachine artifact embedded in an adhesive. In an exemplary embodiment, measurement includes illuminating a portion of the seal containing a population of particles embedded in an adhesive matrix, the population including at least one micromachine artifact of a predetermined shape, collecting image data from the illuminated portion of the seal, and executing an optical pattern recognition algorithm on the image data to identify any artifact matching the at least one predetermined shape.

BRIEF DESCRIPTION OF THE DRAWINGS

Embodiments of the present invention are illustrated by way of example, and not limitation, in the figures of the accompanying drawings in which:

FIG. 5C illustrates a plan view of the tamper resistant seal illustrated in FIG. 5B with a population of particles including at least one micromachine artifact embedded in an adhesive, in accordance with an embodiment;

FIG. 5D illustrates an expanded view of the tamper resistant seal illustrated in FIG. 5C showing a first micromachine artifact embedded at a first location in an adhesive, in accordance with an embodiment;

FIG. 5E illustrates an expanded view of the tamper resistant seal illustrated in FIG. 5C showing a second micromachine artifact embedded at a second location in an adhesive, in accordance with an embodiment;

FIG. 5F illustrates an expanded view of the tamper resistant seal illustrated in FIG. 5C showing a discontinuity in a frame surrounding the population of particles, in accordance with an embodiment;

DETAILED DESCRIPTION

In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive alternatives.

Generally, whereas for conventional RPT the specular particles themselves are of random physical shapes which are not predetermined, the tag technology described herein imparts a predetermined physical uniqueness to at least a subset of the particles embedded in an adhesive. In the exemplary embodiment, at least one, and advantageously more than one, micromachine artifact is included in the population of particles which are embedded in the adhesive. As such, whereas only the light reflecting patterns of the aggregate population of the particles, as applied in the field, imparts an identifiable characteristic to a conventional RPT seal, in the tag technology described herein, one or more of a physical structure, a count, or a relative location, of the one or more micromachine artifacts is associated with a particular seal. The micromachine artifact may then provide a basis for identifying the seal itself (e.g., where the seal or tag is cataloged by a key field derived from the physical shape(s) of the micromachine artifacts), identifying a source/origin of a seal/tag, or identifying an attempt at tampering with a seal/tag.

Figure 1A:
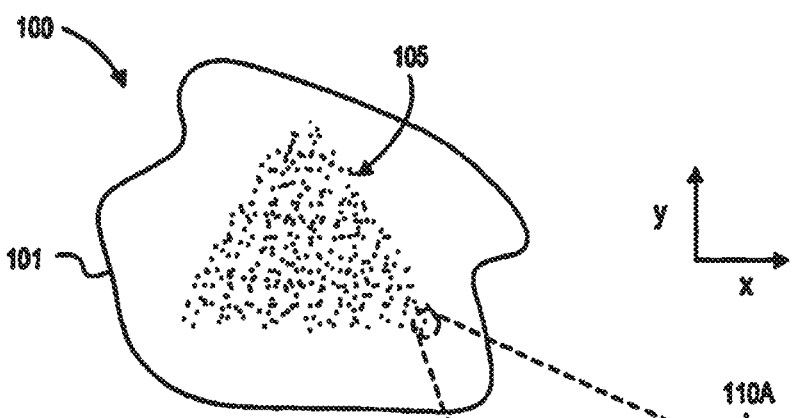
FIG. 1A is a plan view of a tamper resistant seal including a plurality of particles, at least one of which is a micromachine artifact, embedded in an adhesive, in accordance with an embodiment.

FIG. 1A is a plan view of a tamper resistant seal 100 including a population of particles 105, at least one of which is a micromachine artifact 110, embedded in an adhesive 101, in accordance with an embodiment. As illustrated, the tamper resistant seal 100 has been applied to a target object (not depicted). The adhesive 101 is to form a matrix surrounding the particle population 105, permanently fixing their relative location within the seal and permanently adhering them to a surface of the target object. The adhesive 101 is curable into a material which is transparent to light, preferably in the visible band, so that the particles may be readily illuminated and imaged. In embodiments, the adhesive 101 is a thermoplastic which may further be UV-curable. In exemplary embodiments, the adhesive 101 is an optically transparent acrylic resin, such as polymethyl methacrylate (PMMA).

Figure 1B:
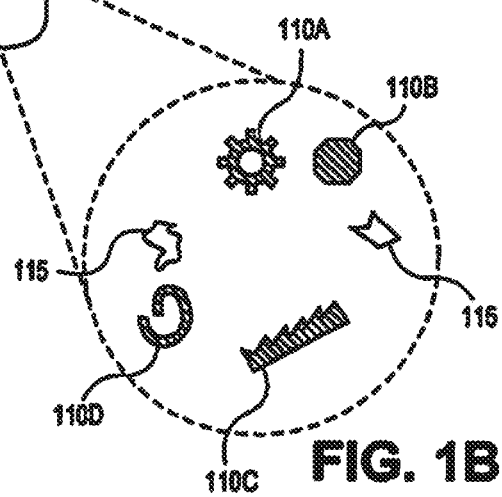
FIG. 1B is an expanded view of the plan view illustrated in FIG. 1A.

FIG. 1B is an expanded view of the plan view illustrated in FIG. 1A. As shown in FIG. 1B, the particle population 105 includes a plurality of particles, at least one of which is micromachine artifact 110 having a predetermined physical shape. The particle population 105 is randomly distributed within the adhesive 101. While in certain embodiments, the entire particle population 105 may consist only of micromachine artifacts, for the exemplary embodiment the particle population 105 further includes particles 115 which have no predetermined shape. The particles 115 having no predetermined physical shape may be randomly shaped or otherwise form a non-identifiable, generic population of particles. In the exemplary RPT embodiment, the particles 115 are specularly reflective particles. The specularly reflective particles may be a mineral, such as hematite, for example, prepared in any manner known in the art. The particles 115 may take other forms as well for RPT or non-RPT embodiments. For example, where other optical phenomena are utilized, such as polarization, etc., the particles 115 may be macromolecules known in the art to impart, as a population, an identifiable polarization characteristic to the seal.

At least one micromachine artifact 110 is included in the tamper resistant seal 100. As further shown in FIG. 1B, a plurality of micromachine artifacts 110A, 110B, 110C and 110D having distinct physical shapes may be embedded in the adhesive 101 to form the single tamper resistant seal 100. For embodiments described herein, a micromachine artifact is a particle which has been patterned into a predetermined shape having at least one length, referred to herein as critical dimension (CD), that is no greater than 500 micrometers ($\mu m$). In certain embodiments, the micromachine artifact is smaller than 500 $\mu m$ in all dimensions. The micromachine artifacts may generally be in any shape or form known in the art and manufactured by any in the vast array of microelectronic and microelectromechanical (MEM) techniques known in the art. Exemplary subtractive techniques include reactive ion etching, wet chemical etching, polishing, and ion beam milling while exemplary additive techniques include chemical vapor deposition (CVD) and physical vapor deposition, either of which may be plasma enhanced.

With the micromachine artifact 110 having a predetermined shape, it may be made relatively complex to manufacture and therefore difficult and/or exceedingly expensive to mimic. Either a micromachine artifact's physical shape or physical location within the adhesive matrix, or both, may further provide a basis for identifying the seal. For example, a combination of at least three structurally distinct micromachine artifacts may be included in the particle population 105, each micro machine artifact type having a different predetermined shape. A source of the seal may then be associated with a library of tens or hundreds of micromachine artifact shapes from which each of the plurality artifacts may be selected to identify a particular seal. A pre-mixed batch of particles may be provided for field application of each seal. The pre-mixed batch of particles may include a plurality of each physically distinct artifact. For example, ten artifacts of a first shape may be mixed with ten artifacts of a second shape and ten artifacts of third shape. The artifact mixture may then be further mixed with particles of an undetermined shape to form the particle population 105. Upon application of the particle population to an object, the combination of micromachine artifact types may then be utilized to identify or catalog the seal in a manner which is physically unique (as opposed to a bar code which is typically only cataloged as logically unique).

In embodiments, the micromachine artifact 110 is a monocrystalline or polycrystalline semiconductor material, such a silicon, germanium, or group III and group V elements, and there alloys. In other embodiments the micromachine artifact 110 is a thin film delaminated from an arbitrary substrate. For such embodiments, the thin film may further be an amorphous material, such as silicon dioxide, or metallic film, such as copper, etc.

Figure 2:
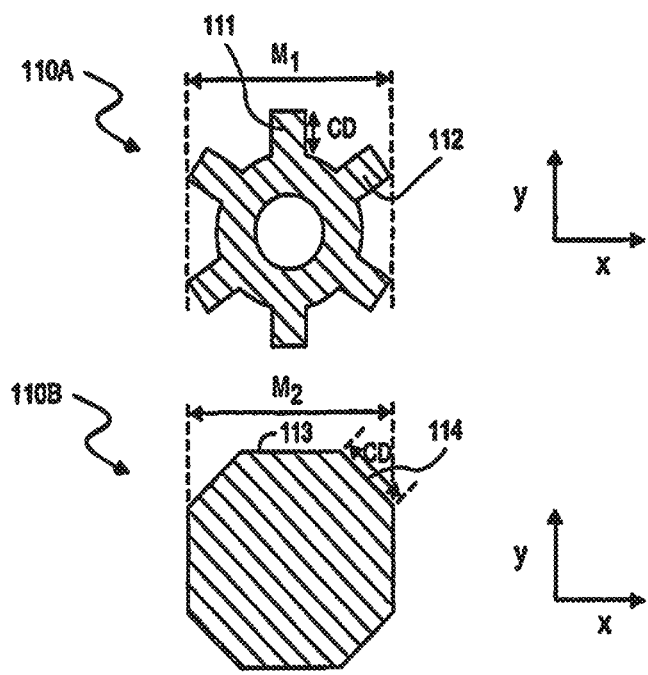
FIG. 2 illustrates a plan view of a micromachine artifact which is embedded in an adhesive, in accordance with an embodiment.

FIG. 2 illustrates an expanded plan view of micromachine artifacts 110A, 11B and 110C from FIG. 1B. In some embodiments, the micromachine artifact includes a plurality of repeating features along an outer edge of the micromachine artifact, each repeating feature having a critical dimension no greater than 500 μm. In one exemplary embodiment, micromachine artifact 110A has a longest length, $M_1$, extending in the x-dimension and is shaped into a gear have a plurality of teeth 111 and 112. In a first embodiment, the longest length $M_1$ is no greater than 500 μm and therefore the teeth 111, 112 define a CD substantially smaller than 500 μm (e.g., hundreds of nanometers to tens of μm). In an alternate embodiment, the longest length $M_1$ is greater than 500 μm, with the teeth 111, 112 defining a CD no greater than 500 μm. The micromachine artifact need not have a highly complex shape and in certain embodiments is a simple polygon. For example, in another exemplary embodiment, micromachine artifact 110B is a hexagon having a longest length $M_2$ in the x and y dimensions with each side 113, 114 having a length defining a CD. In a first embodiment, the longest length $M_2$ is no greater than 500 μm and therefore the sides 113, 114 define a CD substantially smaller than 500 μm (e.g., hundreds of nanometers to tens of μm). In an alternate embodiment, the longest length $M_2$ is greater than 500 μm, with the sides 113, 114 defining a CD no greater than 500 μm.

Figure 3A:
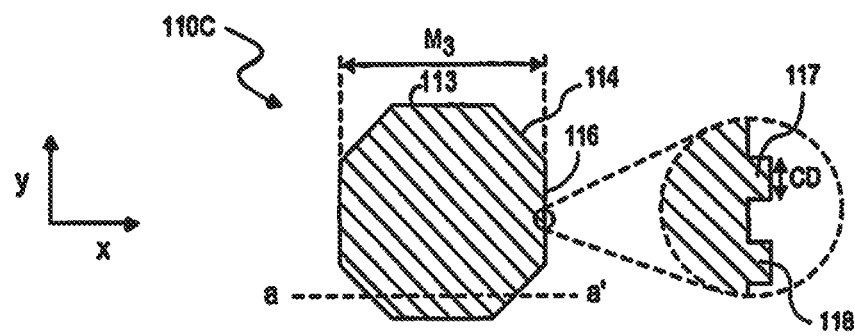
FIG. 3A illustrates a plan view of a micromachine artifact which is embedded in an adhesive, in accordance with an embodiment.
Figure 3B:
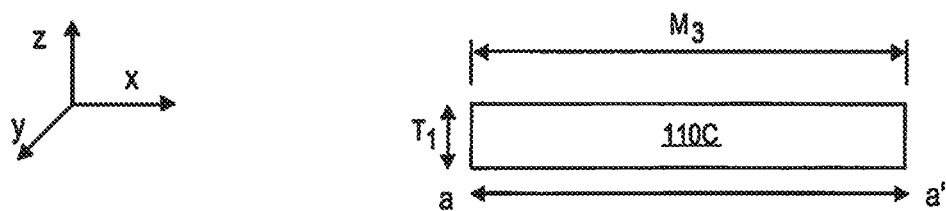
FIG. 3B illustrates a cross-section view of the micromachine artifact illustrated in FIG. 3A, in accordance with an embodiment.

In still another embodiment illustrated in FIG. 3A, a hexagon having a longest length $M_3$ greater than 500 μm, and sides 113, 114 also greater than 500 μm includes plurality of repeating features 117 and 118 formed on a side 116 of the micromachine artifact 110C. Each repeating feature 117, 118 has a critical dimension no greater than 500 μm. FIG. 3B illustrates a cross-section view along the a-a' line of the micromachine artifact 110C illustrated in FIG. 3A, in accordance with an embodiment. As shown, the micromachine artifact 110C has a predetermined physical thickness $T_1$ (along the z-axis) which is less than a longest length $M_3$ of the artifact (in the x or y-axis). Thicknesses less than the longest length may be advantageous in certain applications where mechanical fragility is desirable as a means of tamper detection, as described further elsewhere herein. For exemplary embodiments which employ micromachine artifacts of single crystalline silicon, the thickness $T_1$ will typically be between 50-800 μm as the micromachine artifacts will generally be formed from silicon wafers.

Figure 1C:
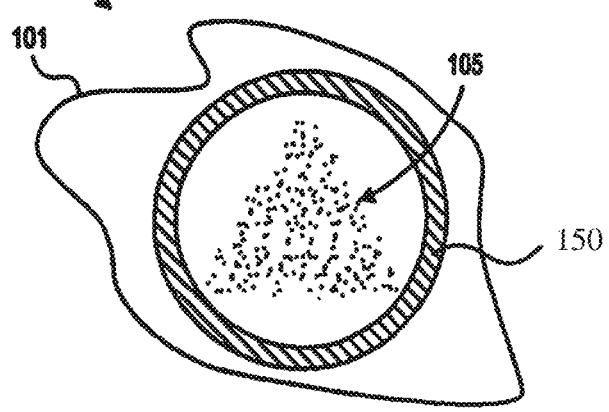
FIG. 1C is a plan view of a tamper resistant seal including a frame surrounding at least one micromachine artifact embedded in an adhesive, in accordance with an embodiment.

FIG. 1C is a plan view of a tamper resistant seal 140 including a frame 150 surrounding the particle population 105 embedded in an adhesive matrix, in accordance with an embodiment. The frame 150 may be added to the tamper resistant seal 140 (e.g., adhered and/or embedded into the adhesive 101 before or after particle population 105 is embedded in the adhesive 101) to arrive at the tamper resistant seal 140. In embodiments, the frame 150 may function as a means of identification, pattern recognition alignment, and tamper detection, as further described herein. In an embodiment, the frame 150 is a continuous material, formed of any of the materials described for the micromachine artifact 110. In further embodiments, the frame 150 includes micromachine features having a CD less than 500 μm forming reliefs along an edge or into a top or bottom surface of the frame 150.

Figure 4A:
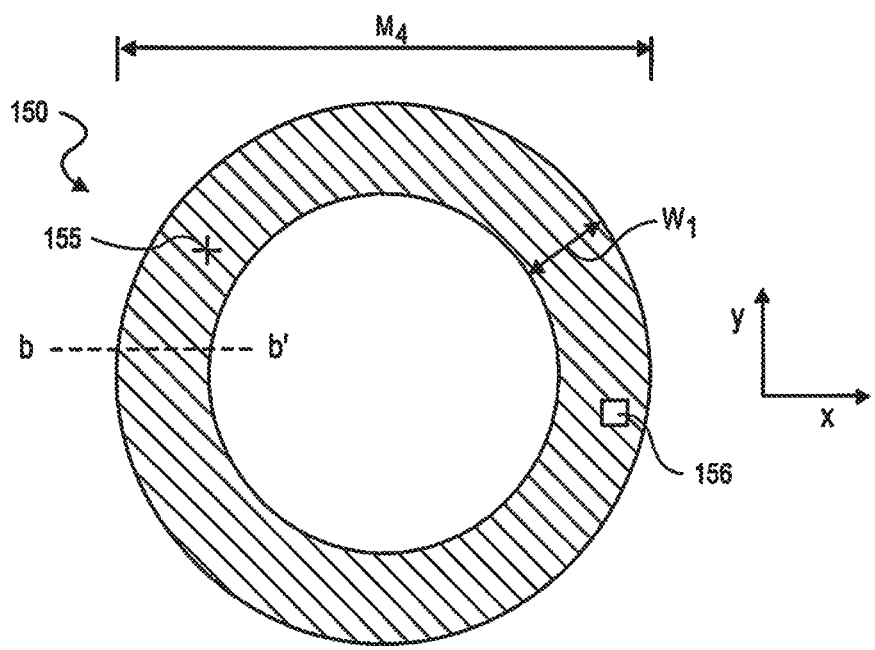
FIG. 4A illustrates a plan view of a frame which is embedded in an adhesive; in accordance with an embodiment.
Figure 4B:
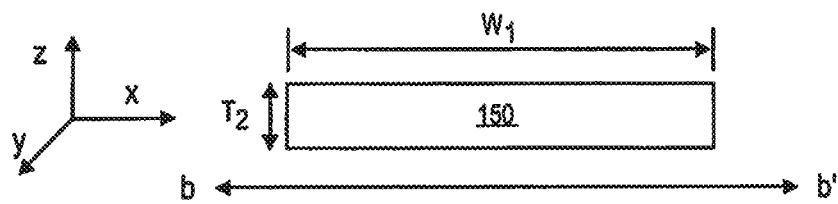
FIG. 4B illustrates a cross-sectional view of the frame illustrated in FIG. 5A, in accordance with an embodiment.

FIG. 4A illustrates a plan view of a frame which is to be embedded in an adhesive, in accordance with an embodiment, while FIG. 4B illustrates a cross-sectional view of the frame 150 along the b-b' line. As shown in FIG. 4A, the frame 150 spans a longest length (e.g., diameter) M4 having annular shape with a frame width $W_1$. As illustrated in FIG. 1C, the frame 150 is to span a macroscopic portion of a seal and therefore $M_1$ may be of virtually any dimension, limited in the exemplary embodiment where the frame 150 is a contiguous piece of single crystalline semiconductor, to the diameter of a silicon ingot (e.g., 200, 300, 450 mm, etc.). To accommodate handling and application in the field, the frame width $W_1$ may be selected to have sufficient mechanical strength which may further be a function of $M_1$. Exemplary frame widths are between a few thousand microns (μm) to tens of millimeters. The frame 150 has a thickness $T_2$ (FIG. 4B) which may be in the thickness range described for the micromachine artifact 110 (e.g., a few hundred to less than a thousand micron).

In an embodiment, the frame 150 includes alignment fiducials 155, 156 integrally formed into the frame material, for example by any of the fabrication techniques described for the micromachine artifact 110. The alignment fiducials 155, 156 may take any form conventional in the art for automated, machine-based pattern recognition algorithms and are to provide a translational and/or rotational frame of reference embedded within a tamper resistant seal (e.g., tamper resistant seal 100) to which image data generated by optical scans of the seal may be referenced and cataloged to a database.

Figure 5A:
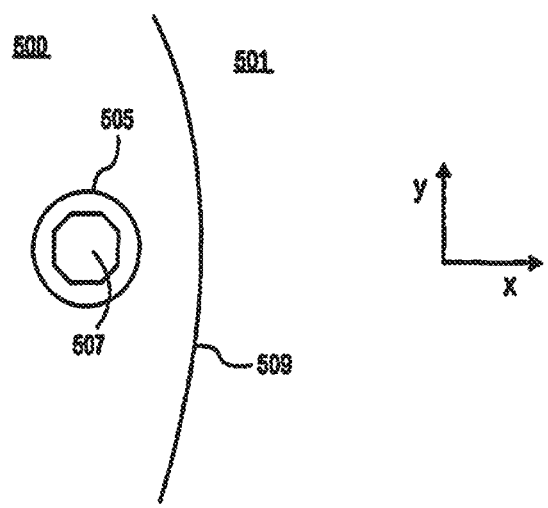
FIG. 5A illustrates a plan view of an object surface to which a tamper resistant seal is to be applied, in accordance with an embodiment.
Figure 5B:
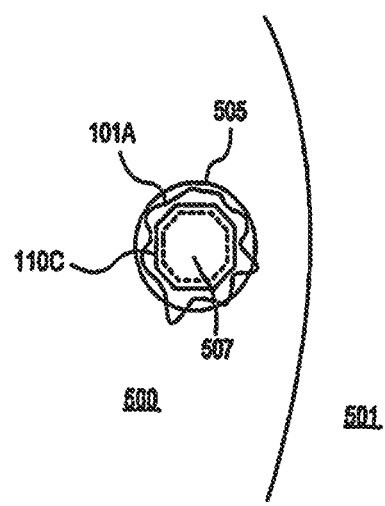
FIG. 5B illustrates a plan view of a tamper resistant seal having a micromachine artifact adhered to the object surface illustrated in FIG. 5A, in accordance with an embodiment.
Figure 6A:
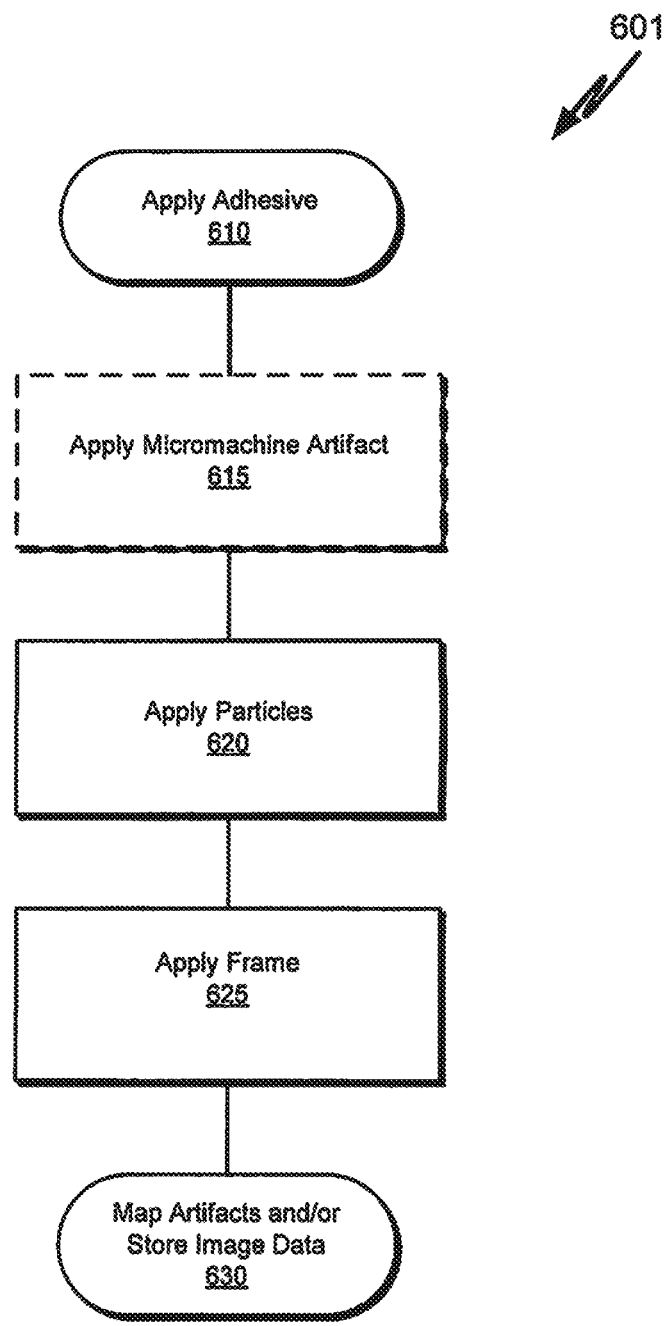
FIG. 6A is a flow diagram illustrating a method of applying a tamper resistant seal having at least one micromachine artifact embedded in an adhesive, in accordance with an embodiment.

FIG. 5A illustrates a plan view of an object to which a tamper resistant seal is to be applied, in accordance with an embodiment. The object includes component surfaces 500 and 501 separated by the void 509. Affixing the component 500 to component 501 is a screw surface 505 having a hex shaped void 507 (e.g., hex-wrench screw). FIG. 6A is a flow diagram illustrating a method 601 for applying a tamper resistant seal having at least one micromachine artifact embedded in an adhesive to an object, such as that illustrated in FIG. 5A, in accordance with an embodiment. At operation 610, an adhesive is applied to an object surface. At operation 615 at least one micromachine artifact is applied. In exemplary embodiment illustrated in FIG. 5B, a hex-shaped micromachine artifact 110C, is adhered with adhesive 101A to the screw surface 505 to span the hex shaped void 507 (e.g., longest length $M_3$ greater than a millimeter). The micromachine artifact 110C may be processed to be non-reflective to mimic the physical appearance of the hex shaped void 507 and be somewhat hidden.

Returning to FIG. 6, a particle population 105 (see FIG. 5C) may then be randomly distributed in adhesive over a portion of the seal at operation 620. In reference to the exemplary embodiment illustrated in FIG. 5C, the particle population 105 may, for example, be applied at operation 620 either as a suspension in uncured adhesive 1019 or physically incorporated after the uncured adhesive 101B is applied to the component surface 500 and 501. As illustrated, a portion of the particle population 105 is disposed over the hex-shaped micromachine artifact 110C to further obscure the physical barrier presented by artifact 110C. As further illustrated by the expanded views in FIGS. 5D and 5E, the particle population 105 may also include at least one micromachine artifact 110A, 110B as well as other particles of unknown shape 115, either or both of which may be specularly reflective. Due to relatively large physical size, concealment, and mechanical fragility, micromachine artifact 110C is susceptible to fracture in response to tag defeat attempts. For the micromachine artifacts 110C which include unique features (117 and 118 in FIG. 3A), imitation is difficult.

Returning to FIG. 6A, a frame is applied at operation 625. In the exemplary embodiment of FIG. 5C, the frame 150 is embedded in the uncured adhesive 101B before or after embedding the particle population 105 and/or the micromachine artifact into the uncured adhesive. As shown in FIG. 5C, the frame 150 is positioned to span the void 509. The adhesive is then cured to affix the particles and frame to the component surfaces 500, and 501. Method 601 completes with mapping the artifacts' positional data at operation 630. For RPT embodiments, sparkle data for the particle population 105 may be further collected using techniques known in the art.

Figure 6B:
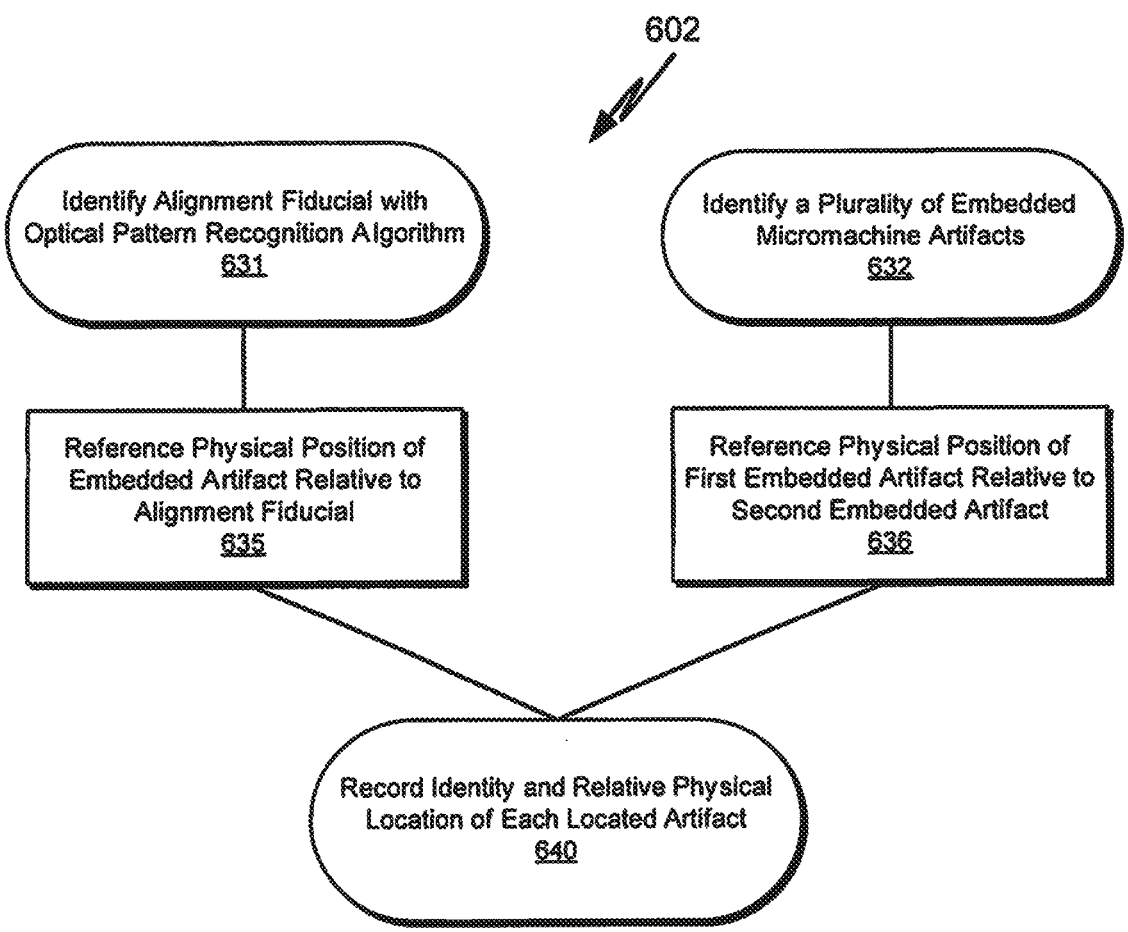
FIG. 6B is a flow diagram illustrating a method of recording positional information for a micromachine artifact embedded in an adhesive, in accordance with embodiments.
Figure 7A:
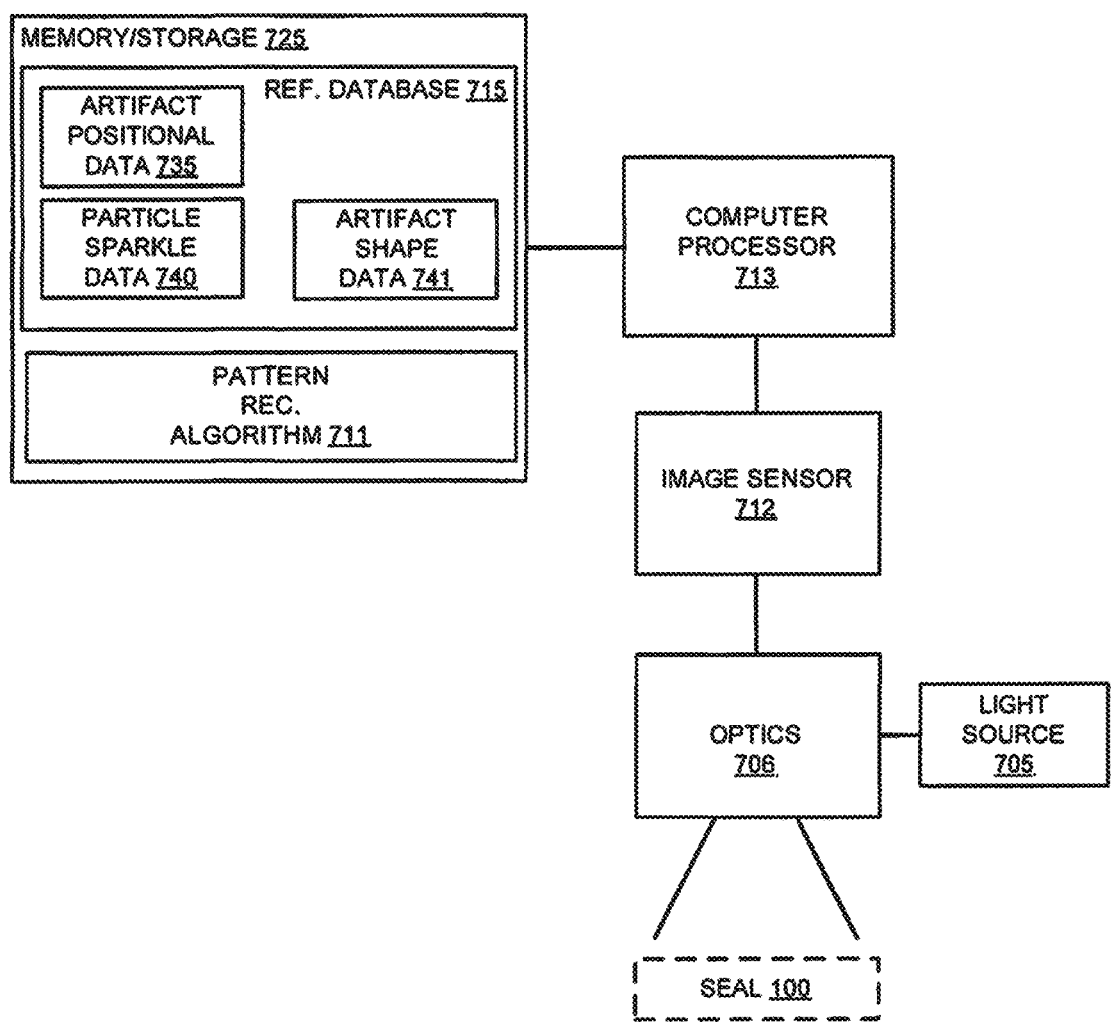
FIG. 7A illustrates a schematic of an apparatus for automatically authenticating a tamper resistant seal having at least one micromachine artifact embedded in an adhesive, in accordance with an embodiment.

FIG. 6B is a flow diagram illustrating a method 602 for mapping positional information of a micromachine artifact embedded in an adhesive, in accordance with embodiments. FIG. 7A illustrates a schematic of an apparatus for automatically performing the method 602. In a first embodiment, at operation 631, a portion of a seal containing a frame surrounding the population of particles (e.g., frame 150 in FIG. 5C) is illuminated by light source 705 (FIG. 7A) through optics 706. Alignment fiducials 155, 156 are identified with a pattern recognition algorithm 711 executed by the computer processor 715. Upon successful recognition of the alignment fiducials 155, 156, a reference orientation for the seal is then recorded to a memory or mass storage device 725 in the reference database 715.

At operation 635, a portion of the seal containing the particle population embedded in an adhesive matrix (e.g., particle population 105 in FIG. 5C) is similarly illuminated and image data from particle population collected with an image sensor 712, such as a CMOS camera. The computer processor 715 executes another pattern recognition algorithm 710 to analyze particle image data in search of physical features matching one or more predetermined shapes, which may for example be accessed from artifact shape data 741 stored to the memory 725. Any conventional edge or contrast based pattern recognition algorithms known in the art may be employed. Each micromachine artifact identified as a match with one of the predetermined shapes is then associated with a relative position within the seal, in the first embodiment relative to the alignment fiducials 155, 156. The position of the identified artifact (e.g., type 110A, or 110B, or 110C, etc.) is then stored to memory 725 as artifact positional data 735. For an RPT embodiment, a reflected light pattern is measured and particle sparkle data 740 is further associated with the artifact positional data 735 and artifact identity (shape data 741) in the reference database 715.

In a second embodiment illustrated in FIG. 6B, at operation 632, a portion of the seal containing the population of particles is illuminated and image data is analyzed as described above, but in absence of any positional reference provided by a frame fiducial (e.g., for embodiments where no frame is incorporated into the seal). Upon identifying a plurality of micromachine artifacts, a physical position and/or orientation of first embedded artifact is referenced relative to second embedded artifact at operation 636. For embodiments where at least three micromachine artifacts are identified at operation 632, the at least three artifacts may be related in two dimensional space to provide a reference orientation and/or positional data 735 which may then be stored along with artifact shape (identity) at operation 640. For an RPT embodiment, particle sparkle data 740 is further associated with the artifact positional data 735 and artifact shape data 741 in the reference database 715.

Figure 6C:
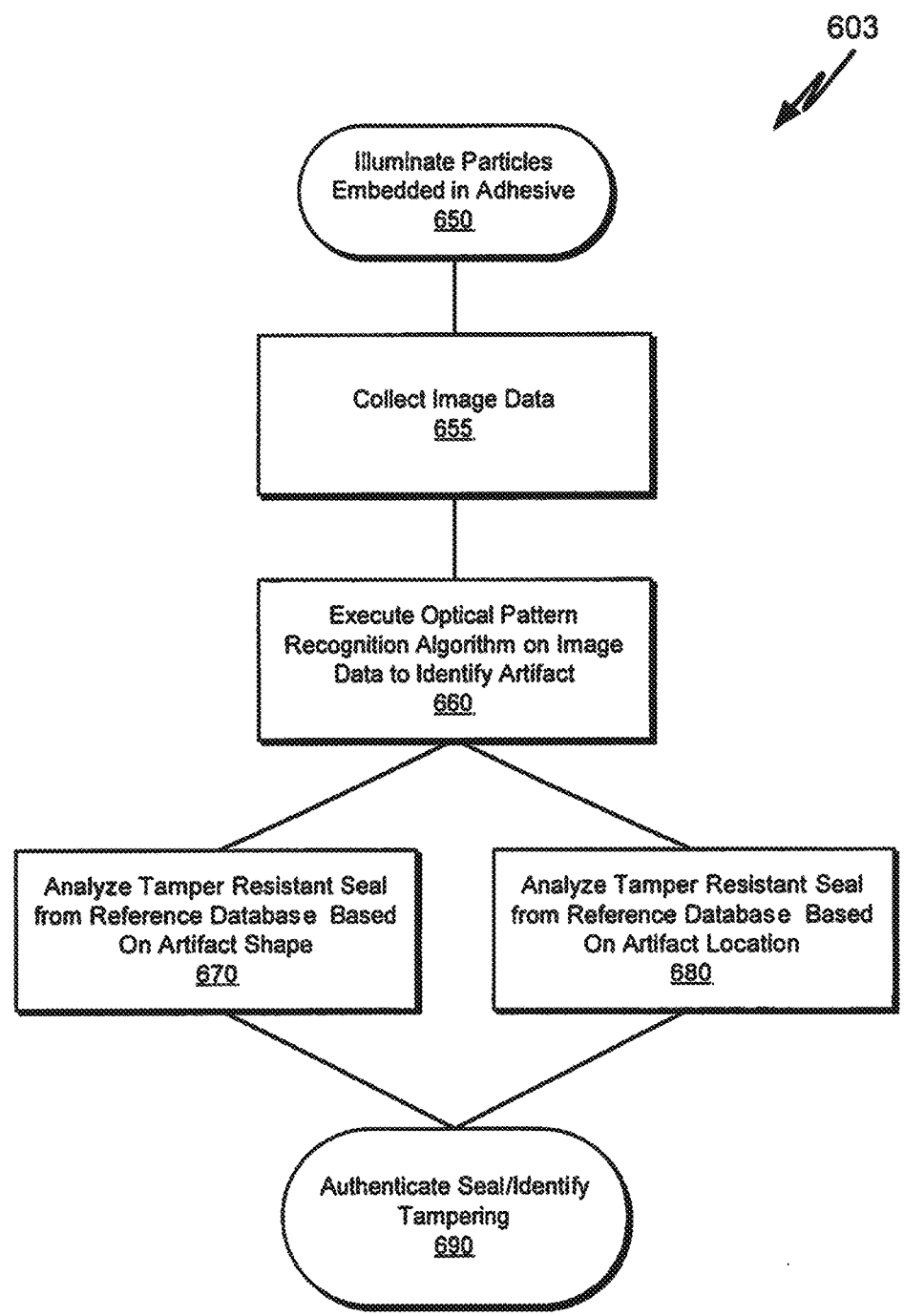
FIG. 6C is a flow diagram illustrating a method of authenticating a tamper resistant seal having at least one micromachine artifact embedded in an adhesive, in accordance with an embodiment.

FIG. 6C is a flow diagram illustrating a method 603 for authenticating a tamper resistant seal having at least one micromachine artifact embedded in an adhesive, in accordance with an embodiment. At operation 650 particles embedded in the adhesive are illuminated at operation 650 and image data is collected at operation 655 and an optical pattern recognition algorithm is executed at operation 660, for example substantially as described for method 602, and the tamper resistance seal is analyzed against a reference database (e.g. based on a referenced artifact shape at operation 670 or a referenced artifact location at operation 680). The seal is then authenticated or tampering identified at operation 690 depending on the outcome of operations 670, 680 (e.g., match or mismatch with reference record).

For embodiments where the micromachine artifacts serve to identify the seal, either or both of a shape (physical identity) or location of each recognized artifact may be utilized as a key field under which a matching record may be recovered for a particular seal previously recorded to a database, such as reference database 715. For embodiments where other means identify the seal, for example where the seal includes a bar code, either or both of a shape (physical identity) or location of each recognized artifact may be utilized as a means to detect tampering with the seal. Changes in either a physical shape of a recognized micromachine artifact, a count of recognized micromachine artifacts, or location of recognized micromachine artifacts relative the artifact positional data 735, and artifact shape data 741 recorded for a particular seal may be automatically identified. For example, a location of an artifact matching a first predetermined shape, relative to the alignment fiducial, is compared to a location previously associated with a micromachine artifact of the first predetermined shape in a database record.

In embodiments, image data collected from a frame surrounding the particle population may also be analyzed for evidence of tampering. For embodiments where the frame 150 is micromachined to have unique features, the frame is both a fragile and difficult to mimic. Because of the physical fragility of the frame (e.g., single crystalline silicon having a diameter of centimeters and thickness of hundreds of micrometers), the frame is subject to fracture during seal bisection attempts. For example, FIG. 5F illustrates an expanded view of the frame 150, in accordance with an embodiment. A discontinuity 570 through the frame may be identified automatically with a pattern recognition routine used to process image data collected under sufficient magnification. For such embodiments, any pattern recognition routines known in the art to be sensitive to the image contrast resulting from the discontinuity 570 may be employed.

For RPT embodiments, where the population of particles further comprise randomly distributed specularly reflective particles of a random shape, either of methods 601 and 603 may be augmented with any conventional method for measuring a reflected light pattern from a tag's particle population. Complex reflection data may be cataloged to a database in association with any micromachine artifacts identified in the tag and/or in association with a tag frame (e.g., frame 150). Authentication and/or tamper detection may then be further premised on a comparison of a measured reflected light pattern with a reference reflected light pattern.

Figure 7B:
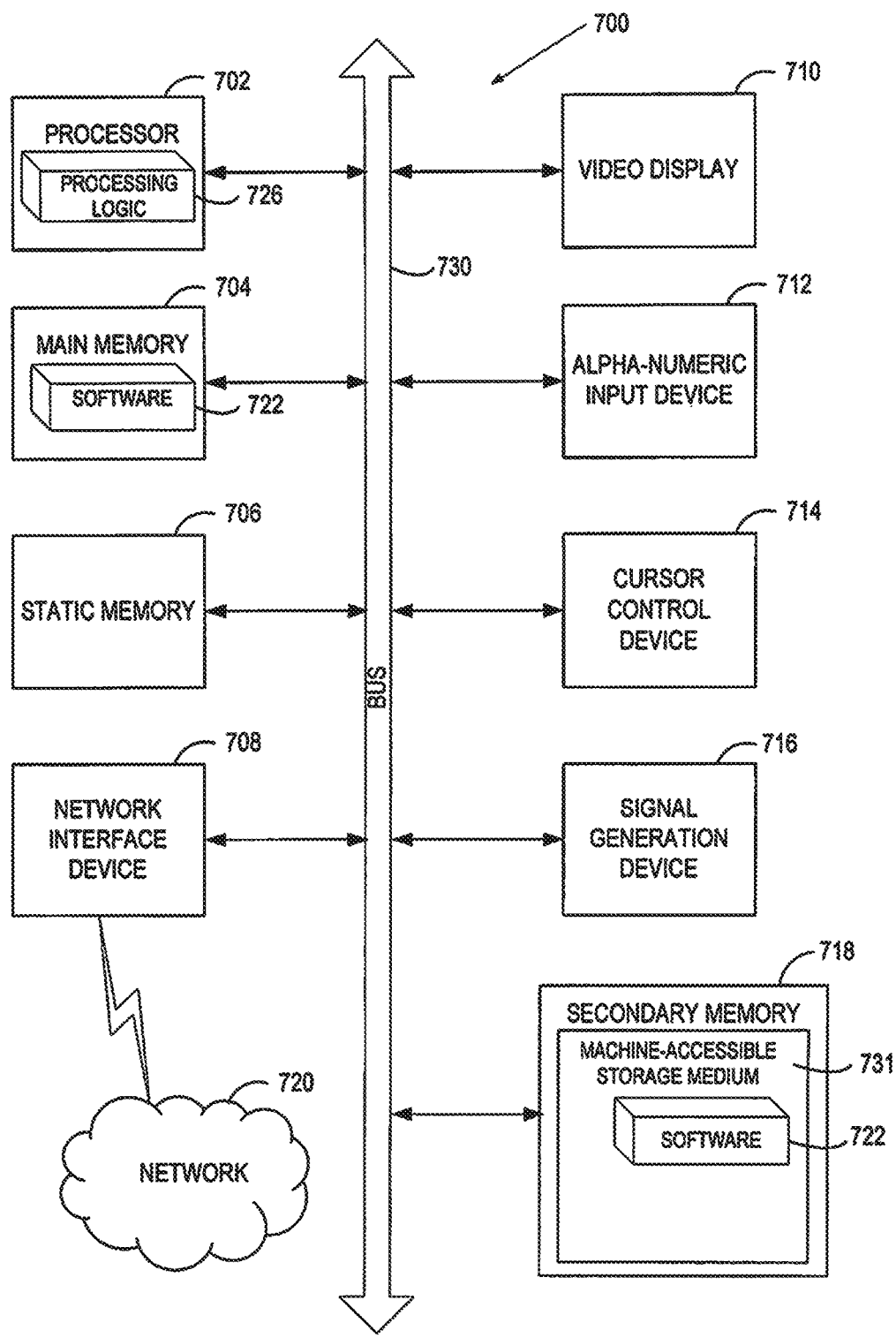
FIG. 7B illustrates a computer system for executing one or more of the algorithms to authenticate a tamper resistant seal having at least one micromachine artifact embedded in an adhesive, in accordance with an embodiment.

FIG. 7B illustrates a computer system 700 within which a set of instructions, for causing the machine to execute one or more of the algorithms discussed herein may be executed, for example to analyze a reflected light from a tag to identify at least one micromachine artifact. The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

The machine-accessible storage medium 731 may also be used to store pattern recognition algorithms, artifact shape data, artifact positional data, or particle sparkle data. While the machine-accessible storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration. Accordingly, the specification and drawings are to be regarded in an illustrative sense rather than a restrictive sense.

What is claimed is:

1. A tamper resistant seal, comprising:
   an adhesive matrix;
   a population of particles embedded in the adhesive matrix, wherein the population includes at least one particle that is a micromachine artifact formed by a microelectronic and microelectromechanical technique to have a predetermined physical shape;
   a frame embedded in the adhesive matrix, the frame being of a contiguous material which forms a perimeter surrounding the population of particles
   wherein the micromachine artifact comprises a material selected from a group consisting essentially of monocrystalline or polycrystalline semiconductor material; and
   wherein the micromachine artifact comprises a plurality of repeating features having a critical dimension of less than 500 µm.

2. The tamper resistant seal of claim 1, wherein the physical shape or physical location of the at least one micromachine artifact within the seal identifies the seal.

3. The tamper resistant seal of claim 1, wherein the population of particles comprises at least three structurally distinct micromachine artifacts, each having a different predetermined shape, the combination of the at least three artifacts identifying the seal.

4. The tamper resistant seal of claim 1, wherein an outer edge of the at least one micromachine artifact includes the plurality of repeating features, each repeating feature having a side with a critical dimension no greater than 500 µm.

5. The tamper resistant seal of claim 1, wherein the predetermined physical shape is defined in a first and second dimension and the artifact has a predetermined physical thickness in a third dimension which is less than a longest length of the artifact in the first or second dimension.

6. The tamper resistant seal of claim 5, wherein the predetermined shape comprises a polygon, at least one side having a dimension smaller than the longest length.

7. The tamper resistant seal of claim 1, wherein the micromachine artifact comprises at least one length greater than a millimeter.

8. The tamper resistant seal of claim 1, wherein the frame is monocrystalline and includes alignment marks integrally formed into the frame material.

9. The tamper resistant seal of claim 1, wherein the adhesive comprises a UV-curable acrylic resin.

10. The tamper resistant seal of claim 1, wherein the population of particles further comprise randomly distributed specularly reflective particles of a random shape.

\* \* \* \* \*